United States Patent
Henning et al.

(10) Patent No.: US 10,670,097 B2
(45) Date of Patent: Jun. 2, 2020

(54) DISC BRAKE WITH ADJUSTMENT MECHANISM HAVING A THREAD DEVICE

(71) Applicant: WABCO EUROPE BVBA, Brussels (BE)

(72) Inventors: Paul Henning, Schwetzingen (DE); Hans-Christian Jungmann, Gorxheimertal (DE); Marcus Keller, Weinheim (DE); Piotr Macutkiewicz, Swidnica (PL); Bernward Redemann, Hockenheim (DE); Gunther Stingl, Muehltal (DE)

(73) Assignee: WABCO EUROPE BVBA, Brussels (BE)

( * ) Notice: Subject to any disclaimer, the term of this patent is extended or adjusted under 35 U.S.C. 154(b) by 0 days.

(21) Appl. No.: 15/515,626

(22) PCT Filed: Nov. 6, 2015

(86) PCT No.: PCT/EP2015/002234

§ 371 (c)(1),
(2) Date: Mar. 30, 2017

(87) PCT Pub. No.: WO2016/082913

PCT Pub. Date: Jun. 2, 2016

(65) Prior Publication Data

US 2017/0307035 A1    Oct. 26, 2017

(30) Foreign Application Priority Data

Nov. 25, 2014 (DE) .................. 10 2014 017 438

(51) Int. Cl.
*F16D 65/56*     (2006.01)
*F16D 55/226*    (2006.01)
(Continued)

(52) U.S. Cl.
CPC ......... *F16D 65/567* (2013.01); *F16D 55/226* (2013.01); *F16D 65/18* (2013.01);
(Continued)

(58) Field of Classification Search
CPC ...... F16D 65/18; F16D 65/567; F16D 55/226; F16D 2125/40; F16D 2125/32; F16D 2121/14
See application file for complete search history.

(56) References Cited

U.S. PATENT DOCUMENTS 4,934,990 A    6/1990    Backers
4,976,417 A *  12/1990   Smith ................. B60G 11/188
                                                    267/154
(Continued)

FOREIGN PATENT DOCUMENTS

CN    101163904 A    4/2008
CN    102105720 A    6/2011
(Continued)

OTHER PUBLICATIONS

English Translation of WO 2006/111149 (Year: 2006).*

*Primary Examiner* — Melody M Burch
(74) *Attorney, Agent, or Firm* — Leydig, Voit & Mayer, Ltd.

(57) ABSTRACT

A disk brake includes a brake disk, a brake caliper, at least one application device lying within the brake caliper on one side of the brake disk, an axially movable device configured to move a brake pad axially toward the brake disk by way of at least one actuating spindle when the brake is actuated, and an adjustment mechanism configured to rotate the actuating spindle because of a rotational coupling acting in the direction of rotation. The adjustment mechanism comprises a thread device, which, at least in the case of rotation in a second direction of rotation opposite a direction of rotation, is configured to mesh with an external thread of the actuating spindle and is configured to screw the adjustment mechanism in relation to the actuating spindle.

20 Claims, 8 Drawing Sheets (51) Int. Cl.
*F16D 65/18* (2006.01)
*F16D 121/14* (2012.01)
*F16D 125/32* (2012.01)
*F16D 125/40* (2012.01)

(52) U.S. Cl.
CPC ...... *F16D 2121/14* (2013.01); *F16D 2125/32* (2013.01); *F16D 2125/40* (2013.01)

(56) References Cited

U.S. PATENT DOCUMENTS

| | | | | |
|---|---|---|---|---|
| 5,123,505 | A * | 6/1992 | Antony | F16D 65/567 |
| | | | | 188/196 D |
| 5,353,896 | A | 10/1994 | Baumgartner et al. | |
| 5,788,022 | A | 8/1998 | Antony | |
| 6,647,814 | B2 * | 11/2003 | Christopher | B60N 2/0296 |
| | | | | 188/77 W |
| 7,152,722 | B1 | 12/2006 | Banks et al. | |
| 7,204,351 | B2 * | 4/2007 | Sandberg | F16D 65/0043 |
| | | | | 188/196 V |
| 2002/0148313 | A1 * | 10/2002 | Schalz | B23Q 5/40 |
| | | | | 74/424.5 |
| 2006/0163011 | A1 | 7/2006 | Sandberg et al. | |
| 2008/0265486 | A1 * | 10/2008 | Schalk | B65H 9/002 |
| | | | | 271/10.13 |
| 2010/0294601 | A1 | 11/2010 | Kraus | |
| 2011/0186391 | A1 | 8/2011 | Gruber et al. | |

FOREIGN PATENT DOCUMENTS

| | | |
|---|---|---|
| DE | 4034165 A1 | 12/1991 |
| DE | 9206052 U1 | 9/1993 |
| DE | 4307018 A1 | 9/1994 |
| DE | 19507308 A1 | 9/1996 |
| DE | 10260597 A1 | 7/2004 |
| DE | 102005003223 A1 | 7/2006 |
| DE | 102008037775 B3 | 2/2010 |
| DE | 202006021050 U1 | 1/2012 |
| EP | 0338248 A1 | 10/1989 |
| EP | 0534989 B1 | 4/1993 |
| EP | 1172578 B1 | 1/2002 |
| EP | 1852627 A2 | 11/2007 |
| EP | 2695780 A2 | 2/2014 |
| WO | WO2006111149 A1 * | 10/2006 |

* cited by examiner

DISC BRAKE WITH ADJUSTMENT MECHANISM HAVING A THREAD DEVICE

CROSS REFERENCE TO RELATED APPLICATIONS

This application is a U.S. National Stage application under 35 U.S.C. § 371 of International Application No. PCT/EP2015/002234 filed on Nov. 6, 2015, and claims benefit to German Patent Application No. DE 10 2014 019 438.7 filed on Nov. 25, 2014. The International application was published in German on Jun. 2, 2016 as WO 2016/082913 A1 under PCT Article 21(2).

FIELD

The invention relates to a disk brake, in particular for commercial vehicles, having a brake disk, a brake caliper, at least one application device lying within the brake caliper on one side of the brake disk, an axially movable device, and an adjustment mechanism.

BACKGROUND

In general, wear adjustment devices are known in different embodiments, e.g. mechanical adjusters of the kind which nowadays ensure a constant release clearance within certain limits in current commercial vehicle disk brakes. Since the adjusters have to maintain a constant release clearance in all driving and braking situations, the requirements on the precision of such adjusters are very high. In particular, this determines the release clearance which must be crossed for pad contact, the pivoting travel of a pivoted lever used for brake application, for example, and thus the maximum braking force that can be applied or the braking force reserve.

In such disk brakes fitted with an adjustment device, the adjustment device is activated in the event of brake actuation and a release clearance that is different from a desired value, e.g. by a feed element of the application device of the disk brake. Thus, if wear occurs on the brake pads and/or the brake disk with a resulting change (increase) in the release clearance, automatic adjustment of the pads is performed by means of the adjustment device, e.g. by an adjusting movement of pressure rams. A release clearance predetermined by the design is reproduced in the form of fixed geometrical quantities in the component elements participating in the adjustment process.

Disk brakes which have an application device actuated by the pivoted lever are known from DE 195 07 308 A1 and DE 10 2008 037 775 B3. In these cases, the application device itself includes a pivoted lever with an eccentrically acting braking shaft, the rotation or sliding axis of which is parallel to the brake disk plane and which acts on a pressure piece that can be moved in the brake caliper. The terms "cross piece" or "bridge" have also been used hitherto instead of "pressure piece". For the sake of simplicity, therefore, only the phrase "movable element" will be used below. The movable element itself is arranged non-rotatably in the brake caliper. Mounted centrally in the movable element is a pressure spindle device, which has a rotatable adjustment nut provided with a pressure collar and a pressure spindle or actuating spindle screwed into said nut but held non-rotatably. Via these parts, the application force is transmitted to at least one brake pad, which is then pressed against the brake disk.

In the above mentioned disk brakes, the adjustment device is held in a fixed manner in that end region of the adjustment nut provided rotatably and with a pressure collar which is remote from the brake disk. Since the adjustment nut itself is likewise mounted in a fixed manner in the movable element, the adjustment device follows the axial movements of the movable element during application movements. The term "in a fixed manner" refers to the position of the adjustment device both when the brake is unactuated and when the brake is actuated and during the adjustment itself.

The parts belonging to the adjuster can be divided functionally into an input region and an output region, wherein the input region is coupled for conjoint rotation to the pivoted lever. The rotary movement is transmitted via a wrap spring acting as a one-way clutch to the output region, which brings about the rotation of the adjustment nut via a mechanical separating clutch/separating device, which is spring-loaded and thus acts in a load- or torque-dependent manner. The separating clutch/separating device is a friction cone, for example. Since the pressure or actuating spindle screwed into the rotatable adjustment nut is held fixed against relative rotation, it is screwed out in the direction of the brake disk. The adjustment step is ended when, owing to the force stroke, the friction in the adjustment nut mounting or threaded pair rises and exceeds the maximum possible adjustment torque. The torque-dependent clutch then slips, thereby preventing elastic brake deformations during the force stroke from affecting the adjustment travel.

In the brakes described above, those parts which belong to the adjuster are connected in series when viewed in an axial direction and are connected in a fixed manner to the movable element. This requires an appropriate installation length in the axial direction. Since the brake application parts, i.e. the adjustment nut and the pressure spindle, furthermore take up a corresponding installation space, it is not possible to increase the size of the parts in order to achieve higher application forces owing to the predetermined caliper shape. Moreover, the adjusting parts which form the spring-loaded mechanical separating device in all the adjustment devices are subject to relative wear in the contact regions, and this affects the accuracy of adjustment.

DE 40 34 165 A1 discloses a disk brake having a movable element referred to as a cross piece. The movable element is provided with a threaded bore, into which is screwed an actuating spindle connected operatively to an adjustment device (rotary drive) for setting the release clearance. In this brake, the totality of the adjustment device serving as a rotary drive is designed as a coherent subassembly of elongate or tubular design in the axial direction. This device is inserted into the interior of the caliper through a caliper opening facing away from the brake disk and is secured in a fixed manner there on the caliper end, with the result that it extends into an opening in the actuating spindle. The rotary drive therefore lies concentrically within the hollow rotary spindle. In this case, the rotary drive or the output part thereof is coupled in a non-rotatable but axially movable manner to the actuating spindle via axial profiles. In this way, the rotary movements of the adjuster are transmitted to the actuating spindle. With increasing wear adjustment, the actuating spindle is screwed out of the movable element in the direction of the brake pad or brake disk and is thus also moved axially relative to the fixed-location adjuster. Friction clutches or ratchet mechanisms, which are each spring-loaded and act mechanically, are used as the torque-dependent separating device within the adjuster subassembly.

Since the adjuster in the brake according to DE 40 34 165 A1 is secured in a fixed manner on the brake caliper and the movable element referred to as a cross piece is moved with the adjusting spindle in each actuation, opposed relative movements take place in the contact regions between the adjuster or the output part thereof and the adjusting spindle, and rotary movements are furthermore superimposed on these movements during an adjustment step. Since the application device, on the one hand, and the adjustment device, on the other, are separate subassemblies here, this requires a corresponding assembly effort. Moreover, the opposed relative movements can affect the accuracy of adjustment.

The brake according to German Utility Module 92 06 052 includes an application device having a pivoted lever and a pressure spindle device, which is not mounted in an additional movable element but is mounted directly in the brake caliper. The adjustment device, in turn, is held in a fixed manner on the brake caliper and rests as a separate subassembly on an axis parallel to the rotation axis of the pressure spindle device. The rotary movements are transmitted by the adjuster to the pressure spindle device via a gear mechanism.

A similar disk brake to that in German Utility Model 92 06 052 is shown in EP 1 852 627 A2. Admittedly, it is designed as a single-spindle brake. On the other hand, however, a parallel offset is provided between the adjuster and the pressure spindle device, with a gear mechanism situated in between.

Both the brake according to German Utility Model 92 06 052 and that according to EP 1 852 627 A2 are provided with mechanically acting separating devices (friction clutch), which are controlled by spring force and are intended to prevent excessive adjustment in the force stroke.

The disk brake according to DE 10 2005 003 223 A1 is a double-spindle brake of similar basic construction to the initially mentioned brakes according to DE 195 07 308 A1 and DE 10 2008 037 775 B3. Once again, a pressure spindle device having an adjustment nut and an actuating spindle is namely mounted in a movable element. The adjustment device is attached in a fixed manner to the movable element, on the one hand, and—as in DE 40 34 165 A1 too, for example—attached in a fixed manner to the brake caliper end, on the other hand. Since, here too, opposed relative movements take place—even within the adjustment device—the first and second regions of the adjuster are coupled by means of an axial connecting clutch (dog clutch). This adjustment device too has a mechanically acting separating device (slipping clutch) in order to avoid excessive adjustments.

DE 20 2006 021 050 U1 shows an adjustment device, which is held in a fixed manner on the brake caliper, mounted between two pressure rams and situated in the force flow of brake application, and a mechanical separating device acting load- or torque-dependently in the form of an axially acting ball clutch in order to avoid excessive adjustment.

DE 43 07 018 A1 shows a disk brake having an adjustment device which is held in a fixed manner on the brake caliper in all operating states and the output part of which extends longitudinally in the actuating spindle. It is connected operatively or coupled to the actuating spindle by means of a profiled disk in a manner which prevents relative rotation but allows axial movement. As a rotary drive for adjustment via a one-way clutch use is made of a torsion spring leg coupled directly to the pivoted lever, wherein the torsion spring acts as an overload safeguard and as an energy storage device in order to adjust the lining wear which takes place during the braking process, possibly also during the brake release stroke. Apart from the disadvantageous opposed relative movements during the application and adjustment process in the contact regions between the application device and the adjuster itself, the embodiment and mounting of the adjuster both with respect to the pivoted lever and the brake caliper and also mounting with respect to the adjusted parts relative to one another owing to frictional effects are fault-prone, in particular. Accuracy of adjustment could thus be impaired. Since, furthermore, the brake application and adjustment parts are arranged in series in the brake caliper—when viewed axially—the resulting overall caliper lengths do not meet the requirements in respect of the restricted installation conditions in the commercial vehicle. Moreover, the assembly effort does not meet all the requirements for automation.

SUMMARY

In an embodiment, the present invention provides a disk brake. The disk brake includes a brake disk, a brake caliper, at least one application device lying within the brake caliper on one side of the brake disk, an axially movable device configured to move a brake pad axially toward the brake disk by way of at least one actuating spindle when the brake is actuated, wherein the actuating spindle is configured to be rotated, has an external thread, and is configured to be screwed into a threaded bore in the movable device, and an adjustment mechanism configured to be rotated about a rotation axis parallel to a rotation axis of the brake disk and which, in the case of rotation in a first direction of rotation bringing about adjustment, is configured to rotate the actuating spindle because of a rotational coupling acting in the direction of rotation. The adjustment mechanism comprises a thread device, which, at least in the case of rotation in a second direction of rotation opposite the first direction of rotation, is configured to mesh with the external thread of the actuating spindle and is configured to screw the adjustment mechanism in relation to the actuating spindle.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments described herein relate to a disk brake having a brake disk, a brake caliper, at least one application device lying within the brake caliper on one side of the brake disk, an axially movable device, and having an adjustment mechanism. Disk brakes of this kind are generally pneumatically or electromechanically actuable. The axially movable device is configured to move a brake pad axially toward the brake disk by at least one actuating spindle when the brake is actuated, wherein the actuating spindle can be rotated, has an external thread, and is screwed into a threaded bore in the movable device. The adjustment mechanism can be rotated about an axis lying parallel to the rotation axis of the brake disk and, in the case of rotation in a first direction of rotation bringing about adjustment, can rotate the actuating spindle because of a rotational coupling acting in said direction of rotation.

Embodiments of the invention build upon the disk brake known from DE 40 34 165 A1. Embodiments of the invention improve the known brake in such a way that certain the disadvantages in respect of construction, mounting, accuracy of adjustment, and flexibility of use may be avoided.

According to an embodiment of the invention, a disk brake is provided having an adjustment mechanism having a thread device, which, at least in the case of rotation in a second direction of rotation opposite a first direction of rotation, meshes with an external thread of an actuating spindle and screws the adjustment mechanism in relation to the actuating spindle.

In other words, the adjustment mechanism is not held in a fixed manner on the brake caliper or in a fixed manner on the movable element, as in the known brakes. On the contrary, holding/mounting is directly on the threaded region of the actuating spindle. The operative connection is established directly via the external thread of the actuating spindle. Means of fastening/holding the adjustment mechanism on the movable element or on the brake caliper, which are required in the known disk brakes, can therefore be omitted. The actuating spindle itself carries the adjustment mechanism.

As already mentioned above, according to an embodiment of the invention, the adjustment mechanism is held directly on the actuating spindle. An adjustment nut can therefore be omitted. This considerably simplifies the brake.

According to an embodiment of the invention, the thread device is a wrap spring, which has the same pitch as the external thread of the actuating spindle. This wrap spring can therefore perform two functions simultaneously. On the one hand, it serves to enable the adjustment mechanism to be screwed with the actuating spindle, at least as regards the second direction of rotation. On the other hand, it forms a one-way clutch which ensures that the adjustment mechanism is rotationally coupled to the actuating spindle in the case of rotation in the first direction of rotation and therefore rotates the actuating spindle.

According to an embodiment of the invention, provision is furthermore preferably made for two or more turns of the wrap spring to mesh with the external thread of the actuating spindle. Reliable coupling is thereby ensured.

According to another embodiment of the invention, it is envisaged that an end section of the wrap spring is held on a guide sleeve of the adjustment mechanism, preferably by positive engagement. A particularly simple form of coupling the wrap spring to the guide sleeve is thereby provided.

The guide sleeve can have at least one thread device, which meshes with the external thread of the actuating spindle. In other words, according to this embodiment not only the actuating spindle (in the second direction of rotation) but also the guide sleeve mesh with the external thread of the actuating spindle. The guide sleeve is thereby held even more reliably on the actuating spindle without the need to rely on the wrap spring alone.

According to an embodiment of the invention, the wrap spring furthermore rests radially on the outside in a spiral groove. This ensures that the wrap spring, which is coupled axially to the actuating spindle, on the one hand, is also coupled axially to the other parts of the adjustment mechanism, on the other hand, thereby ensuring axial coupling of the entire adjustment mechanism to the actuating spindle in a manner which is reliable overall.

As a further option according to an embodiment of the invention, the adjustment mechanism can be moved axially by at least a distance which corresponds to the maximum adjustment distance per adjustment step. This embodiment ensures that the adjustment mechanism does not make stop contact anywhere in any conceivable operating state owing to axial movements.

As a further option according to an embodiment of the invention, a braking device which counteracts rotation of the actuating spindle can be provided. A braking device of this kind is used, on the one hand, to hold the actuating spindle fast during the screwing movements of the adjustment mechanism in the second direction of rotation. On the other hand, the braking device is used to avoid (unwanted) adjustments due to vibration and shaking on poor road surfaces.

As a further option according to an embodiment of the invention, the adjustment mechanism preferably has at least one groove, the width of which corresponds to a desired release clearance. In the case of disk brakes which are applied by means of a pivoted lever, the groove accommodates a driver pin, which is used to rotate the adjustment mechanism during braking. Here, the play of the driver pin in the groove determines the release clearance.

According to another embodiment of the invention, the adjustment mechanism has an input region and an output region as well as a torque-dependent clutch situated between the two regions. Here, the torque-dependent clutch forms an overload safeguard. As a preferred option according to an embodiment of the invention, the torque-dependent clutch has a torsion spring. As a further preferred option according to an embodiment of the invention, the torsion spring is preloaded.

Finally, provision is preferably made according to an embodiment of the invention for the torsion spring to be designed to store energy in the braking overstroke and hence to adjust the actuating spindle in the release stroke for purposes of brake adjustment. This embodiment makes it possible to achieve the desired release clearance again more quickly in the case of relatively severe wear, simply because adjustment takes place not only during the braking stroke but additionally also during the release stroke.

As explained above, the adjustment mechanism is, according to an embodiment of the invention, preferably divided into at least two functional regions, namely an input region and an output region. The two regions are preferably concentric with respect to one another and are coupled to one another in such a way that they support one another not only radially but also axially. Thus, the adjustment mechanism forms a preassembled compact subassembly. It is thereby possible to save installation space in comparison with conventional brakes, where the individual adjusting parts are situated axially in series within the caliper. Moreover, holders or fastening parts, such as brake caliper regions, are no longer necessary to connect or couple the individual parts circumferentially and axially to one another.

The operative connection between the actuating spindle and the adjustment mechanism is preferably implemented in the threaded region of the actuating spindle remote from the brake disk, which extends into the caliper interior from the movable element. The saving in installation space thus achieved can be used for more generous dimensioning of the individual parts and/or for additional functional parts.

In the functional position, the adjustment mechanism is preferably fixed in the axial direction on the threaded region of the actuating spindle by positive engagement via its output region in such a way that there is always a defined spacing position relative to the movable element, at least in the operating state in which no adjustment step is performed. A functional clearance between relevant mutually facing surfaces of the movable element, on the one hand, and of the adjustment mechanism, on the other hand, also makes it impossible for any (static) friction stemming from trapped stresses in the holder etc. and affecting the adjustment to occur.

The operative connection of the adjustment mechanism to the actuating spindle for setting the desired release clearance is designed in such a way that, when there is an increase in the release clearance owing to pad wear, the required adjustment step can take place during and/or after a brake actuation.

For this purpose, the adjustment mechanism is preferably coupled to the thread region of the actuating spindle by means of a wrap spring acting as a one-way clutch, wherein the wrap spring furthermore rests positively in the thread profile of the actuating spindle, preferably by means of at least two turns. Since the wrap spring acts positively and in a manner dependent on the direction of rotation in the locking direction—i.e. in the case of an adjustment step being required—the actuating spindle is screwed out of the threaded bore of the movable element in the direction of the brake disk, wherein the wrap spring—and thus the entire adjustment mechanism—accompanies this axial movement owing to the rotation and in accordance with the amount of adjustment. In other words, the actuating spindle and the adjustment mechanism perform synchronous movements during the adjustment step.

To ensure that the adjustment mechanism screwed onto the actuating spindle via the wrap spring does not strike against the movable element and is thus blocked during this screwing-out movement, the functional clearance already mentioned above in the form of the distance between the mutually contacting surfaces of the adjustment mechanism, on the one hand, and of the movable element, on the other hand, is preferably greater than the maximum possible adjustment step or travel. Thus, there is "floating" support for the adjustment mechanism by means of the actuating spindle via the positive engagement and in the locking direction of the wrap spring. In the above sense, "floating" means that the adjustment mechanism synchronously follows the actuating spindle, at least over the travel of the respective adjustment step. During this process, the abovementioned functional clearance is reduced (temporarily).

Once the adjustment step is complete and the braking process is ended, the brake application and adjusting parts move back into their initial position by virtue of the restoring force of at least one compression spring. During this process, the adjustment mechanism is screwed back into its initial position and to the abovementioned functional clearance in the direction of free movement of the wrap spring. To ensure that the actuating spindle is not screwed back during this process, a brake ring is preferably provided according to the invention, said brake ring being held on the movable element, for example, and acting with a constant frictional torque on the actuating spindle. The frictional or holding torque acting as a result on the external thread or axially on the thread flanks of the actuating spindle is preferably greater than the release or free-running torque of the opening wrap spring resting in the thread. Since said frictional torque acts continuously, no unwanted rotary movements of the actuating spindle with unwanted changes in the release clearance can occur, even in the case of brake vibrations, for example.

While the adjustment mechanism remains in a fixed and constant/self-supporting position relative to the movable element over the entire wear-compensating adjustment travel (brake pad/brake disk), the actuating spindle is screwed out to an increasing extent in the direction of the brake disk until the pad wear limit is reached.

According to an embodiment of the invention, the wrap spring acting as a one-way clutch is preferably arranged so as to rest internally in a sleeve-shaped output region (referred to below as a guide sleeve) belonging to the adjustment mechanism, wherein, according to the invention, there is furthermore preferably positive engagement with the guide sleeve, at least at one end of the wrap spring, in the form of engagement in a recess or in the form of partial wrapping of one end of the spring at an extension/projection. In this way, the two parts are fixed on one another circumferentially and axially because the wrap spring rests in the actuating spindle thread in a screwed-on/positive manner.

In order to improve the positioning of the wrap spring relative to the thread region, on the one hand, and of the guide sleeve relative to the wrap spring, on the other hand, even further, the guide sleeve preferably has, according to the invention, profiling which corresponds to the thread pitch and is in the form of a spiral groove, in which the wrap spring rests. Thus, a defined positive engagement with one another is established, improving not only functional accuracy but also assembly/the screwing of the adjustment mechanism onto the actuating spindle during initial assembly. In this way, the guide sleeve is positioned indirectly on the thread region of the actuating spindle by means of the wrap spring.

According to an embodiment of the invention, a further improvement in the retention of the guide sleeve in the axial direction with respect to the thread region of the actuating spindle is furthermore preferably achieved in the case of an inserted wrap spring by the direct engagement of the guide sleeve in the thread formed by the wrap spring in order, where necessary, to remove trapped stresses from the adjustment system during adjustment and/or release processes.

In this case, the guide sleeve then has inwardly situated, partially circumferential projections corresponding to the thread profile of the actuating spindle, said projections engaging in the thread of the actuating spindle. When viewed axially, the projections are preferably spaced apart in such a way that the wrap spring rests in the interspace thereof for engagement in the thread, with or without a spiral groove. As a result, the wrap spring is relieved of axial guidance because the axial positive engagement of the guide sleeve on the thread of the actuating spindle is achieved directly by means of the projections.

The above-described methods of direct and indirect support can be combined in any desired manner according to requirements.

According to an embodiment of the invention, a further sleeve-shaped part, referred to below as a grooved ring, is furthermore preferably used as an input region of the adjustment mechanism. The grooved ring is mounted so as to be capable of relative rotation on the guide sleeve, wherein both parts preferably have such contours at the ends that the grooved ring is also held axially on the guide sleeve.

According to another embodiment of the invention, the grooved ring has at least one axial groove region, which preferably protrudes radially and into which at least one pivoted lever used to apply the brake or a driver, preferably a driver pin, connected to a braking shaft of this type, engages so as to activate the adjustment mechanism. The design desired release clearance is defined in the stop play between the walls of the at least one driver pin and the at least one axial groove. However, to make engagement more reliable, the desired release clearance can also be defined by groove segments similar to gearwheels and by a plurality of spaced driver pins. Moreover, it is also possible to kinematically reverse the engagement to the extent that geometrical conditions allow. The pivoted lever or the braking shaft would then be provided with one or more grooves, and the grooved ring would carry one or more driver pins.

In order to transmit a rotation starting from the grooved ring via the guide sleeve to the wrap spring—and thus also to the actuating spindle—for an adjustment step, an elastic part is, according to the invention, preferably mounted on the grooved ring and coupled in such a way, under a preload, to the grooved ring and the guide sleeve that the grooved ring and the guide sleeve are braced against one another in the circumferential direction by means of the restoring force of the elastic part at stops defined relative to one another. The elastic part is preferably a torsion spring, which, in the preloaded state, engages by means of its spring ends respectively in a grooved ring region and a guide sleeve region.

As another preferred option according to an embodiment of the invention, the torsion spring is arranged with a radial play relative to those components which serve to support it, in this case the grooved ring, the guide sleeve or an associated driver disk. This eliminates the possibility of bottoming or blocking of the spring travel during torsion processes.

Figure 1:
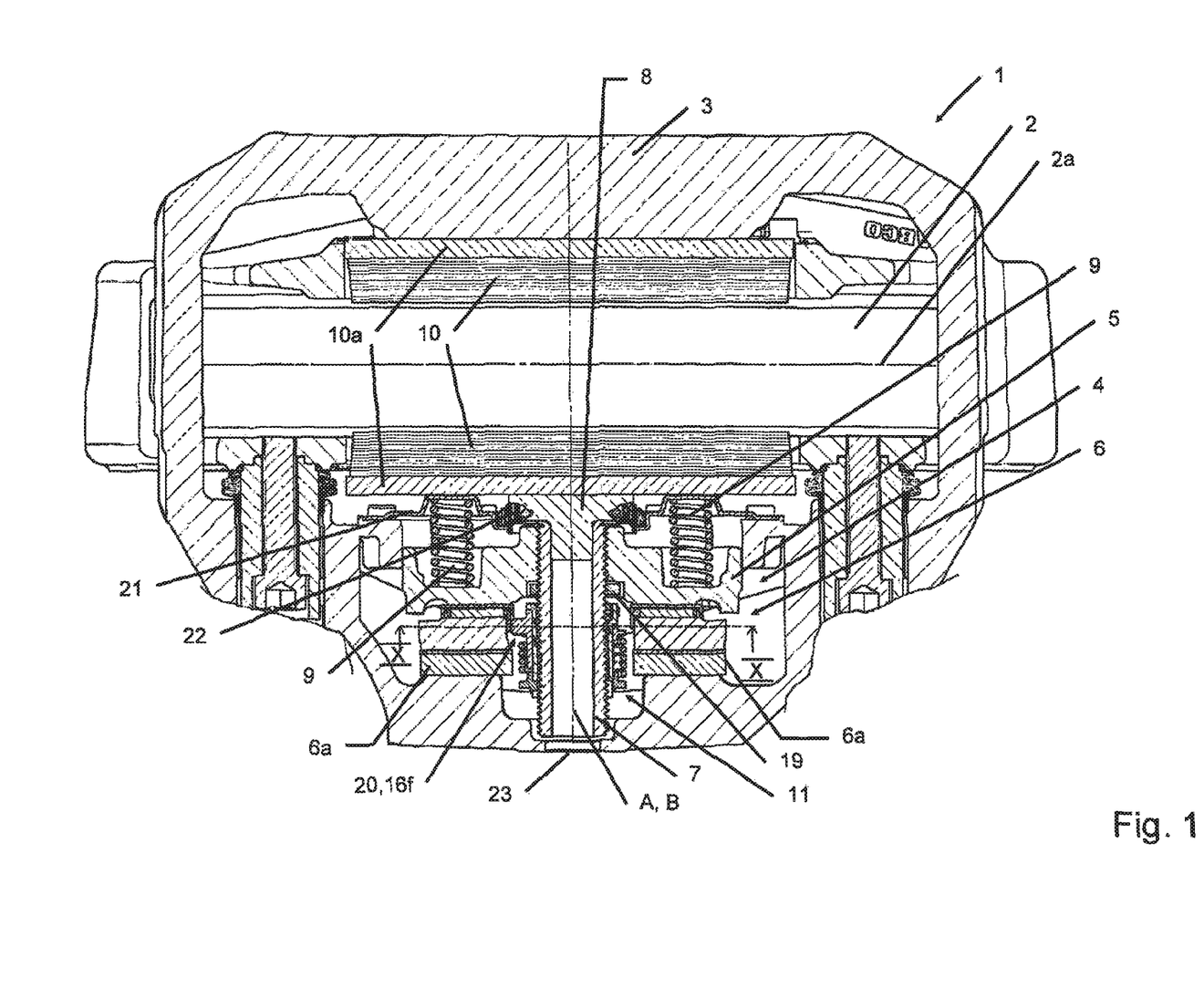
FIG. 1 shows a partially sectioned plan view of a disk brake according to an embodiment of the invention.
Figure 2:
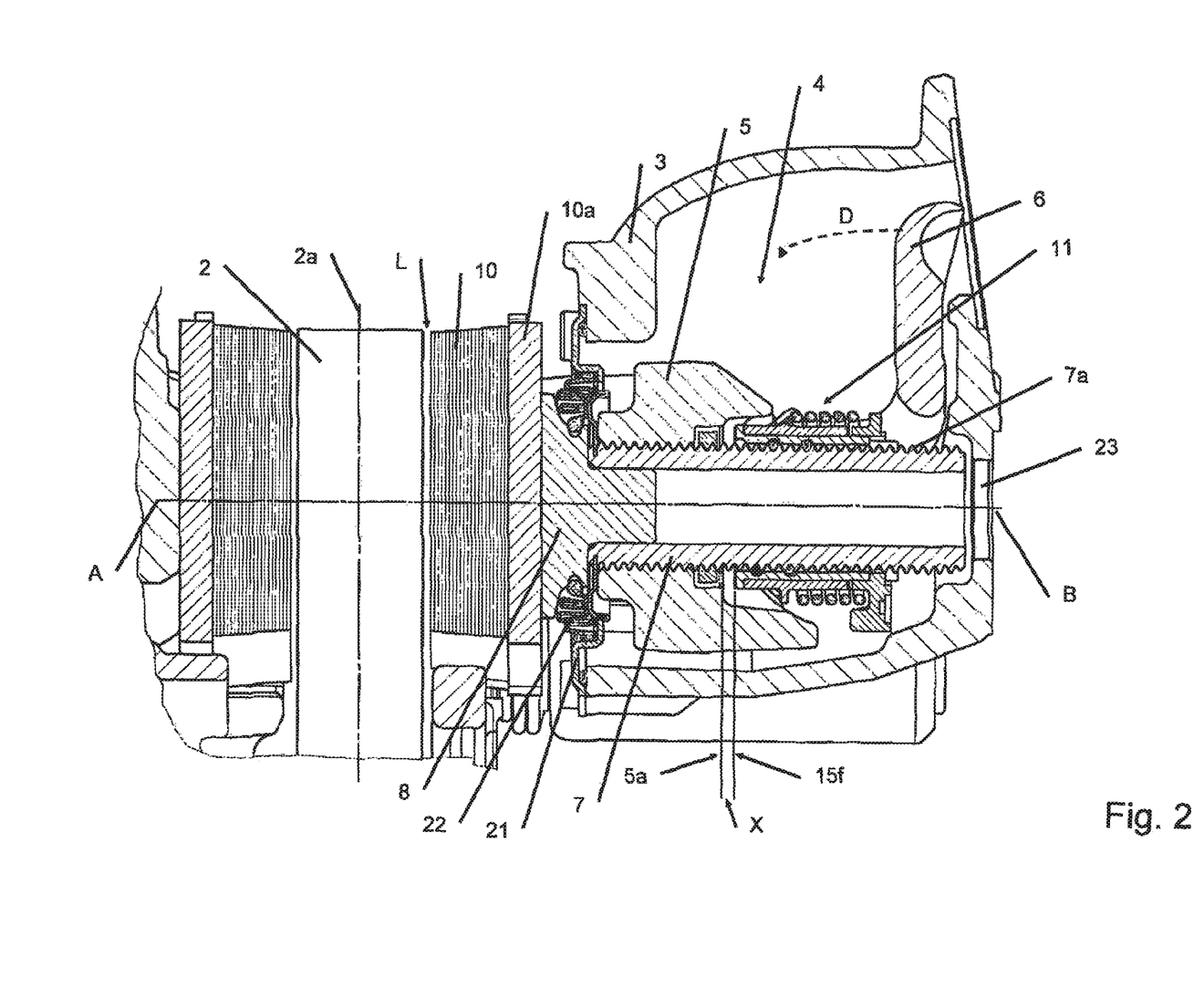
FIG. 2 shows a sectioned side view of the disk brake of FIG. 1.

The disk brake illustrated in the drawings and denoted by the reference sign 1 is a pneumatically or electromechanically actuated disk brake, the brake caliper 3 of which fits around a brake disk 2. Brake pads 10, each having a brake pad carrier 10*a*, are provided on both sides of the brake disk 2. An application device is denoted in a general way by the reference numeral 4. In this case, it is arranged on one side in the brake caliper 3, which can be a sliding caliper or a fixed caliper. The application device 4 includes a pivoted lever 6, which is connected to an application or braking shaft 6*a* arranged in the brake caliper 3 parallel to the principal plane 2*a* of the brake disk 2. A movable element 5, which likewise extends transversely to the brake disk plane 2*a* and is guided in the brake caliper 3, is furthermore provided. The pivoted lever 6 forms the connection between an actuating device (not shown), which introduces a force, and the braking shaft 6*a*. The brake axis is parallel to the principal axis (not shown) of the brake disk 2 and is denoted by the reference index A-B.

If the pivoted lever 6 is pivoted in direction D, in a manner which will not be explained in greater detail here, by an actuating device, which is secured on the end of the brake caliper, by means of a push rod that passes through a functional opening, for example, it exerts pressure via the transverse braking shaft 6*a* on the movable element 5, which, in the illustrative embodiment shown, is formed by a flexurally stiff cross piece of the brake and is mounted in the brake caliper 3 in a manner which prevents rotation but allows axial movement. The application device 4 is braced in such a way by at least one compression spring 9 arranged in the brake caliper 3 that all the functional parts rest against one another and the pivoted lever 6 is in its rest position, thus eliminating slippage.

The movable element 5 has at least one threaded bore, into which at least one actuating spindle 7 is screwed by means of an external thread 7*a*. The illustrative embodiment shown in the drawing is a single-spindle brake. The (single) actuating spindle 7 is screwed centrally into the movable element 5. Thus, the application force is transmitted to the application-side brake pad 10 either directly via the actuating spindle 7 or, as in the illustrative embodiment shown, via a pressure piece 8 inserted into the actuating spindle 7. When the pivoted lever 6 is actuated, the brake pad 10 is therefore displaced and, after crossing the (desired) release clearance L, is pressed against the brake disk 2.

On the brake-disk side, the brake caliper 3, which accommodates within it all the functional parts, is closed by a closure cap 21, wherein the through opening in the closure cap for the actuating spindle 7 is sealed off by at least one boot 22. On this side, therefore, the interior of the brake caliper is closed off and protected from environmental influences, for example.

The fully preassembled subassembly of the adjustment mechanism is denoted in a general way by the reference numeral 11. In FIGS. 1 and 2, it is shown in the initial position with new brake pads 10. Here, the adjustment mechanism 11, which is screwed directly onto the actuating spindle 7, is in the position behind the movable element 5. A functional clearance X in the form of a spacing is present between an end face 15*f* of the adjustment mechanism 11 and an end face 5*a* of the movable element 5. The functional clearance X is larger than the maximum possible adjustment step or travel of the unscrewing actuating spindle 7 during an adjustment process. It should be noted that the dimensions L, X shown in the Figures serve only for illustration and, in actual fact, are dependent in terms of magnitude on the respective type of brake.

Coupling or activation of the adjustment mechanism 11 is accomplished by means of a driver pin 20, which is held on the braking shaft 6 and engages in an axial groove 16*f* of the adjustment mechanism 11. In the illustrative embodiment shown, a brake ring 19 is illustrated schematically, said ring exerting a constant frictional or retaining torque on the actuating spindle 7 and thus preventing unwanted rotary movements of the actuating spindle 7. The brake ring 19 is preferably held on the movable element 5.

Figure 3:
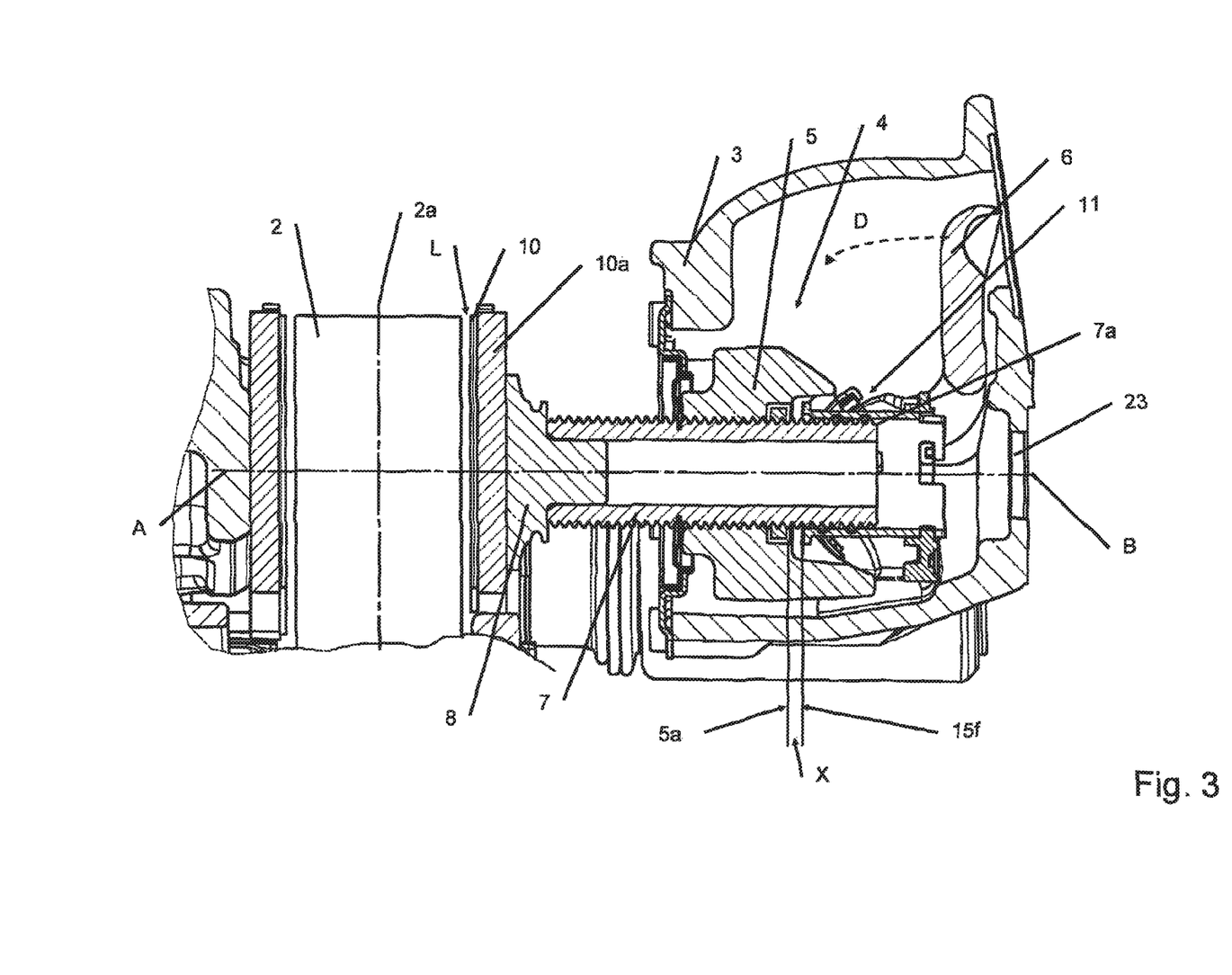
FIG. 3 shows the same view as FIG. 2 but with worn brake pads and unscrewed actuating spindle.

While FIGS. 1 and 2 show the new state of the brake pads 10 and of the brake disk 2 with a corresponding position of the parts in the interior of the brake, FIG. 3 shows schematically the state when the brake pads 10 are worn with a correspondingly changed position of the parts. Comparison of FIG. 3 with FIGS. 1 and 2 makes clear how the actuating spindle 7 has been screwed out of the movable element 5 and relative to the adjustment mechanism 11 owing to the adjustment steps or movements in the direction of the brake disk 2, while all the other positions of the parts have been maintained. There is also a decisive advantage of the adjustment mechanism shown here as regards reliability of braking. If, for example, the maximum possible pad wear is exceeded for whatever reason while driving, and the brake continues to be operated with excessive wear, the actuating spindle 7 is prevented from being screwed too far out of the movable element 5 owing to the reduction in the engagement of the wrap spring 14. In other words, it is no longer possible for adjusting torques and hence also adjusting movements to be transmitted. As a result, the thread contact, via which the flow of force stemming from the pivoted lever passes, within the scope of the pad wear, during the braking process, is maintained even in extreme states. In the case of conventional adjusters, this screwing out—with immediate loss of braking—cannot be reliably prevented.

If the brake pads 10 are replaced in this state, the actuating spindle 7 must be screwed back again in order to establish the required distance from the brake disk 2 for the new pads. In the illustrative embodiment shown here, a functional opening 23 is provided for this purpose on the rear side of the brake, via which opening the actuating spindle 7 can be screwed back into its initial position using suitable means and in a manner that will not be explained in detail here. After the pads have been changed, the position of the parts is then once again as shown in FIGS. 1 and 2. The functional opening 23 should be closed sealingly by suitable means.

Figure 4:
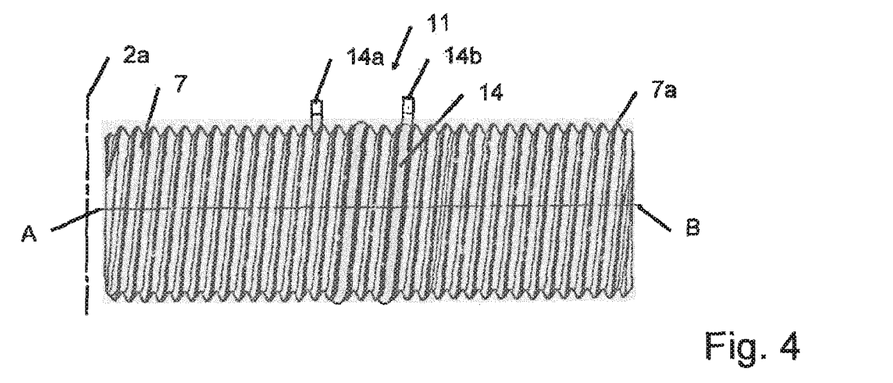
FIG. 4 shows schematically an actuating spindle with an inserted wrap spring according to an embodiment of the invention.

FIG. 4 shows schematically how the wrap spring 14, which acts as a one-way clutch—and establishes the operative connection to the subassembly comprising the adjustment mechanism 11—and has protruding ends 14a, 14b, rests positively in the external thread 7a of the actuating spindle 7. This detail is no longer clearly visible in the assembled condition.

Figure 5:
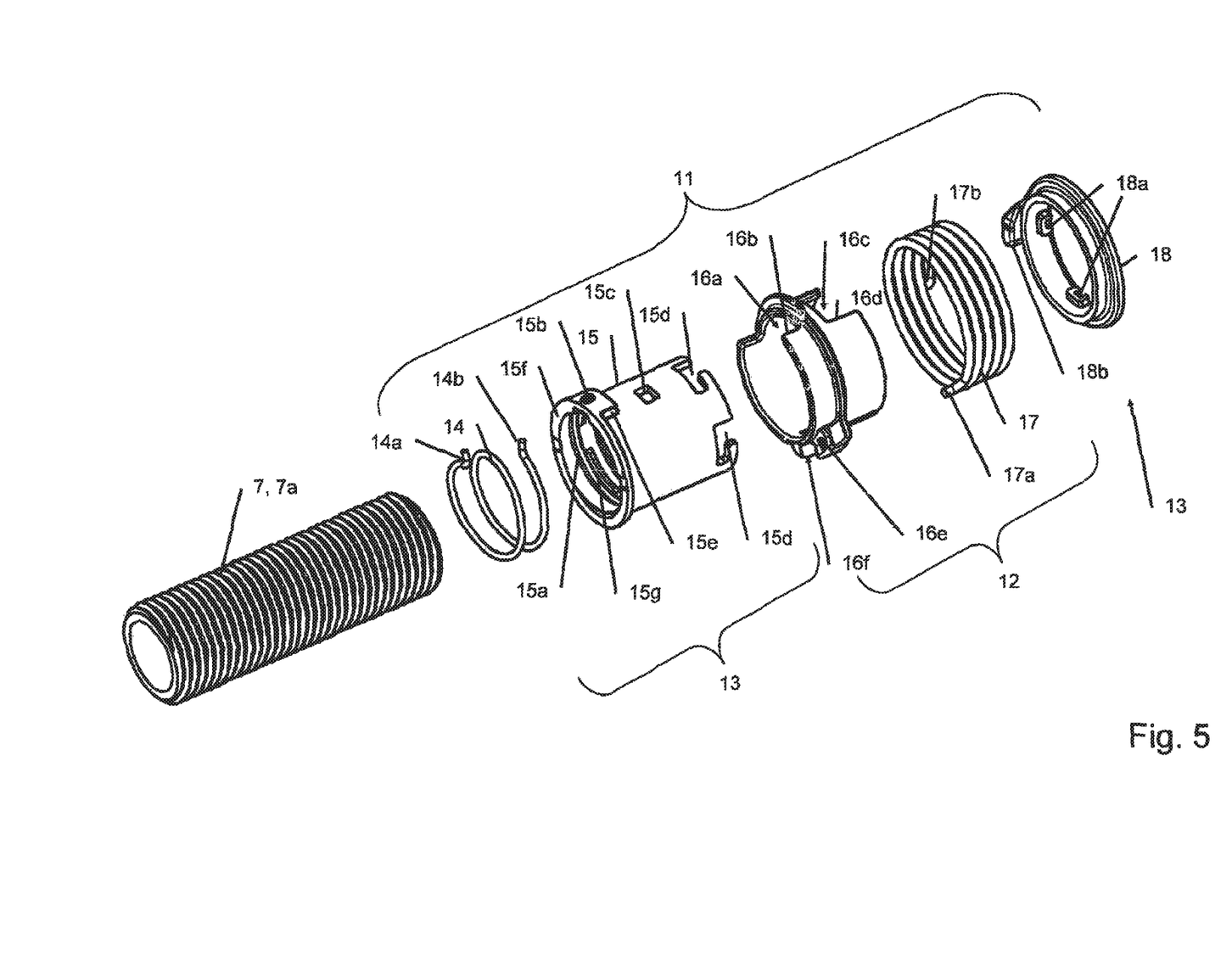
FIG. 5 shows an exploded view of the adjustment mechanism according to an embodiment of the invention.

FIG. 5 shows, in an exploded view, the adjustment mechanism 11 with the parts which are to be allocated to an input region 12 and an output region 13. A grooved ring 16 belongs to the input region 12. The wrap spring 14, a guide sleeve 15 and a driver disk 18 connected to the latter belong to the output region 13, wherein the connection can be of frictional, material, nonpositive and/or positive design. Between the input region 12 and the output region 13 there is a torsion spring 17. However, given appropriate choice of materials, it is also possible, within the scope of the invention, to produce the guide sleeve 15 integrally with the driver disk 18 with the required functional contours. For this purpose, all that is then required for further assembly of the parts, e.g. retention/fastening of the torsion spring 17 and of the grooved ring 16, is to design these parts accordingly while retaining their basic functions.

In its interior, the guide sleeve 15 accommodates the wrap spring 14, wherein the wrap spring 14 is positioned in an axially fixed manner in/on functionally predetermined insertion and/or retaining regions of the guide sleeve 15. For this purpose, a radial extension or projection 15b is present on the guide sleeve 15, on the one hand. Either a projecting spring end 14a of the wrap spring 14 here engages in a retaining opening, or the end 14a of the wrap spring 14 reaches in a loop around the projection 15b so as to be coupled thereto in the circumferential direction. The other projecting end 14b of the wrap spring 14 engages in a longitudinal opening 15c extending relatively circumferentially in the guide sleeve 15. In this way, the wrap spring 14 and the guide sleeve 15 are coupled to one another. To ensure that the wrap spring 14 resting in the external thread 7a of the actuating spindle 7 transmits the positive engagement not only to the guide sleeve 15 but even more efficiently also to the subassembly comprising the adjustment mechanism 11, a spiral groove 15a with a pitch corresponding to the pitch of the wrap spring is formed in the guide sleeve 15 in the illustrative embodiment shown in the drawing. It serves for reliable bearing contact. As already explained above, the guide sleeve 15 can also have inwardly situated, partially circumferential projections/moldings 15g corresponding to the thread profile of the actuating spindle 7, said projections/moldings engaging in the external thread 7a of the actuating spindle 7. These projections/moldings 15g are spaced apart from one another in the axial direction in such a way that the wrap spring 14 can rest therebetween for engagement in the external thread 7a, whether with or without a spiral groove 15a. The wrap spring 14 is thereby relieved of axial guidance. The axial positive engagement of the guide sleeve 15 on the external thread 7a is namely accomplished directly by means of the projections/moldings 15g. This type of direct and/or indirect support can be combined in any desired way depending on requirements. Between the wrap spring 14 and the inner wall of the guide sleeve 15 there is a radial functional clearance, thus allowing the wrap spring 14 to expand sufficiently in the opening or release direction. This ensures the smoothness of operation of the adjustment mechanism 11 in this direction.

On a radial extension 15b of the guide sleeve 15 there is a stop surface 15e formed in the circumferential direction, the function of which will be explained below. The end of the guide sleeve 15 on this side is formed by a circumferential radial collar, the end face 15f of which lies opposite the end face 5a of the axially movable element 5 in the installed state, wherein the functional clearance X already explained above is formed therebetween. The driver disk 18 is secured in a fixed manner on the other end of the guide sleeve 15 when the adjustment mechanism 11 is fully assembled. Depending on the embodiment, this can be a frictional, material, nonpositive or positive connection. In the embodiment shown in the drawing, circumferential profiled openings 15d are formed on the guide sleeve 15 and latching projections 18a are formed on the driver disk 18 in order to lock the two parts together bayonet-fashion. As required for the further adjustment function, the driver disk 18 has a radially protruding projection 18b.

The grooved ring 16 mounted rotatably on the guide sleeve 15 has (on the left in the drawing) an elongate recess 16a, which extends in the circumferential direction and (at the bottom in the drawing) forms a stop surface 16b. The recess 16a is dimensioned in such a way that a radial extension 15b engages therein with a stop surface 15e of the guide sleeve 15. On the one hand, the two stop surfaces 15e and 16b rest against one another. On the other hand, relative rotatability of the grooved ring 16 on the guide sleeve 15 in accordance with the length of the recess 16a is possible. The grooved ring 16 furthermore has a radial extension 16e, which serves, on the one hand, for positive support/retention of an angled spring end 17a of the torsion spring and on which, on the other hand, an axial groove 16f having groove walls 16g, 16h is formed at a distance from the retaining region. The driver pin 20 already mentioned engages in the axial groove 16f for activation of adjustment. A further elongate recess 16c is provided here in the grooved ring 16, on the right in the drawing, in the opening region of which recess that end 14b of the wrap spring 14 which passes through an opening 15c of the guide sleeve 15 extends. This length too is dimensioned in such a way that relative rotatability of the grooved ring 16 on the guide sleeve 15 in accordance with the length of the recess 16c is possible. Conversely, it is also possible for the stop surface 16d to press against the spring leg 14b so as to open the wrap spring 14.

During the assembly of the parts explained individually above, the torsion spring 17 is installed behind the retaining regions 16e, 18b by means of its spring ends 17a, 17b at a corresponding preloading angle. By means of its restoring force, the grooved ring 16, on the one hand, and, via the driver disk 18, the guide sleeve 15, on the other hand, are preloaded against one another at the stop surfaces 15e, 16b thereof.

At this point, it is expressly pointed out that, in the illustrative embodiment of the invention shown in the drawing, those parts or functional regions of the adjustment mechanism 11 which serve for preloading and adjustment, e.g. parts 15e, 16a, b, e, f, 17a, b and 18b, are of dimensions and/or in angular positions relative to one another which are predetermined by the design in the assembled state, when viewed in the circumferential direction.

Figure 6:
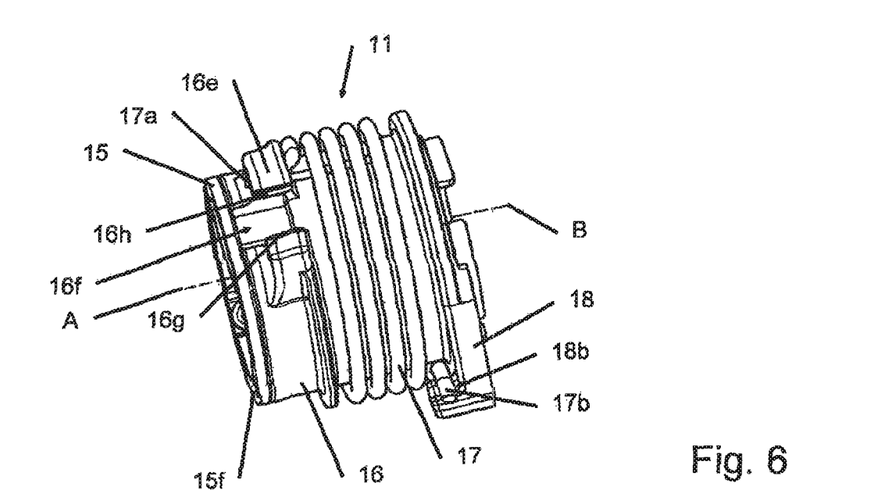
FIG. 6 shows an adjustment mechanism as a preassembled subassembly according to an embodiment of the invention.

The self-supporting and preassembled subassembly of the adjustment mechanism 11 is shown by FIG. 6, where the axial groove 16f with walls 16g, 16h is also shown.

Figure 7:
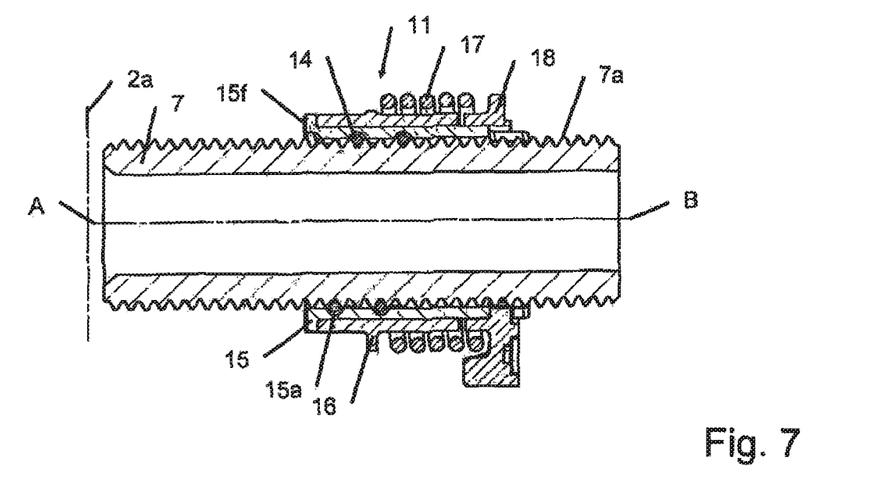
FIG. 7 shows a schematic sectional view of an actuating spindle with an adjustment mechanism screwed on according to an embodiment of the invention.
Figure 8:
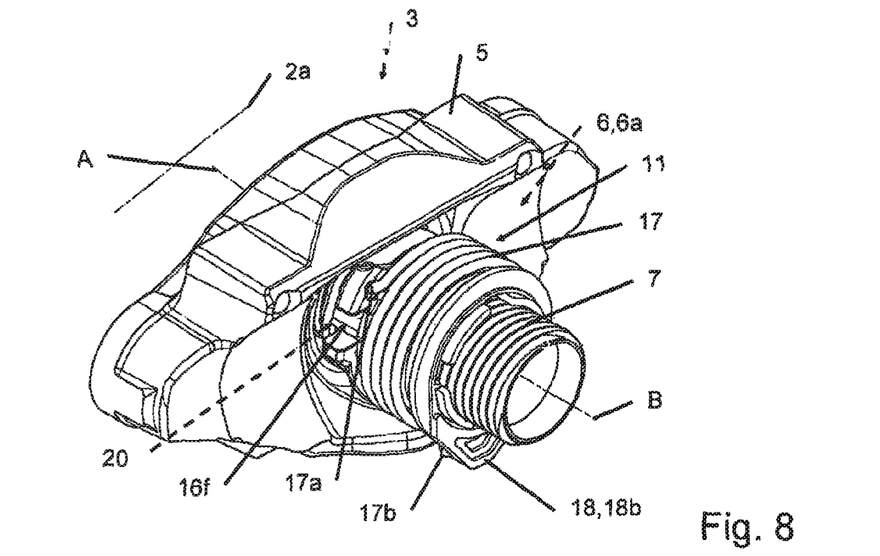
FIG. 8 shows a schematic perspective view of a subassembly with an application device and a screwed-on adjustment mechanism in an initial position according to an embodiment of the invention.
Figure 9:
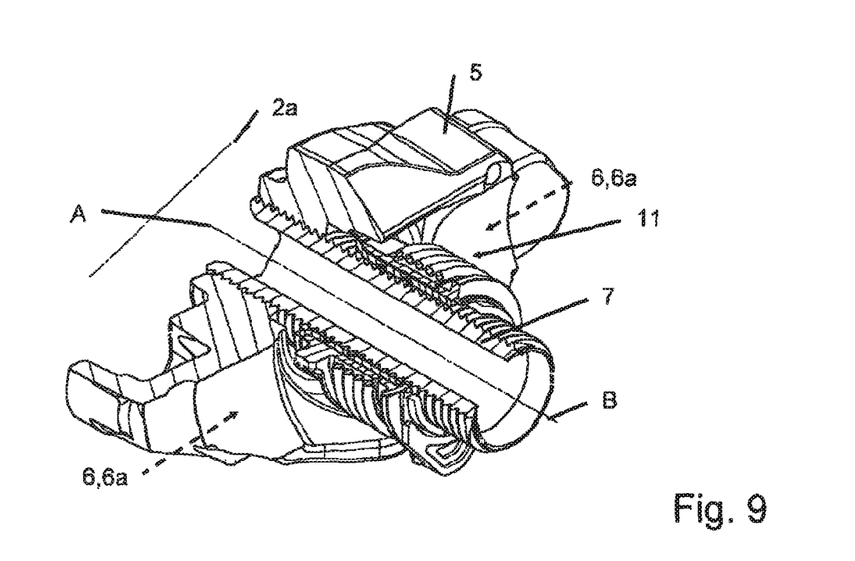
FIG. 9 shows the same view as FIG. 8 but partially in section.

According to FIG. 7, the adjustment mechanism 11 is screwed positively by means of the wrap spring 14 onto the actuating spindle 7 having the external thread 7a. The actuating spindle 7 with the adjustment mechanism 11 is then installed/screwed into the movable element 5 as shown in FIGS. 8, 9.

The installation positions/spacings of the individual components relative to one another are dimensioned in such a way that both the alignment of the axial groove 16f and the required functional clearance X required for the unhindered adjusting process for complete assembly with further parts of the application device can be preset. The installation and functional positions are shown by FIGS. 1 and 2. Attention is drawn to the above explanations.

The process of an adjustment is explained below in detail, in particular with reference to FIGS. 2, 10, 11, and 12.

If the brake according to FIG. 2 is actuated by means of an actuating device (not shown in the drawing) attached to the brake caliper 3, the pivoted lever 6 is pivoted in direction D, wherein the brake application parts on the input side are moved with the brake pad 10 along the axis A-B in the direction of the brake disk 2 against the spring force of the compression springs 9 by means of the braking shaft 6a. During this process, the idle stroke is traversed, corresponding to the desired release clearance L. Here, the desired release clearance L is predetermined by the design in FIG. 10a as the stop play between the walls of the axial groove 16 and the driver pin 20. Initially, the driver pin 20 rests against the upper groove wall 16h. If the idle or application stroke is within the desired release clearance L, only an application movement but no adjusting movement takes place.

Figure 10A:
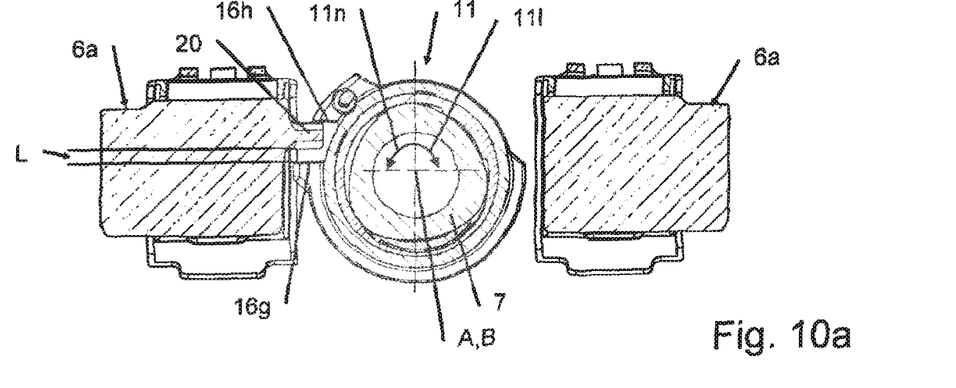
FIGS. 10a to 10c show partial sectional views from FIG. 1 in various functional positions.
Figure 10B:
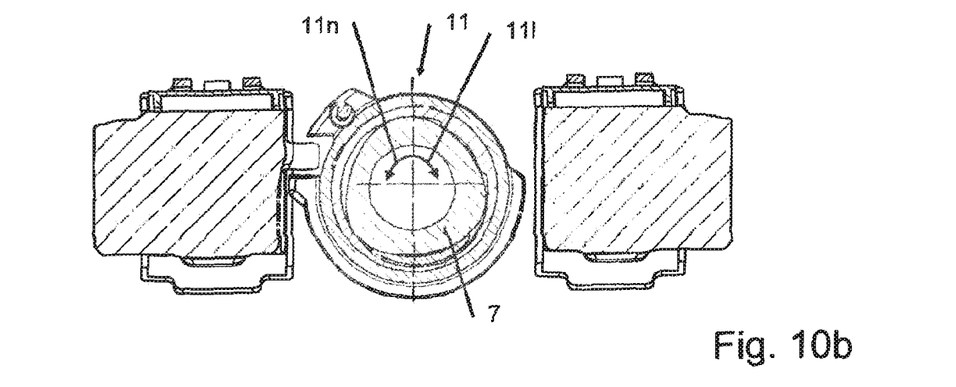
Figure 10C:
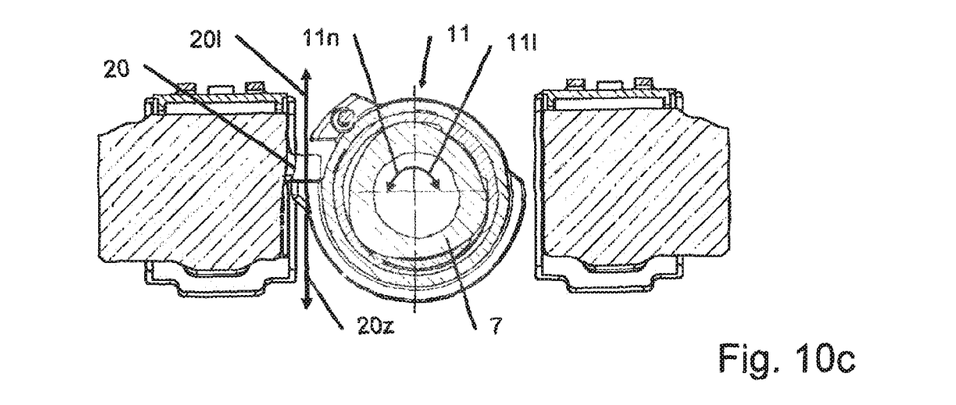
Figure 11:
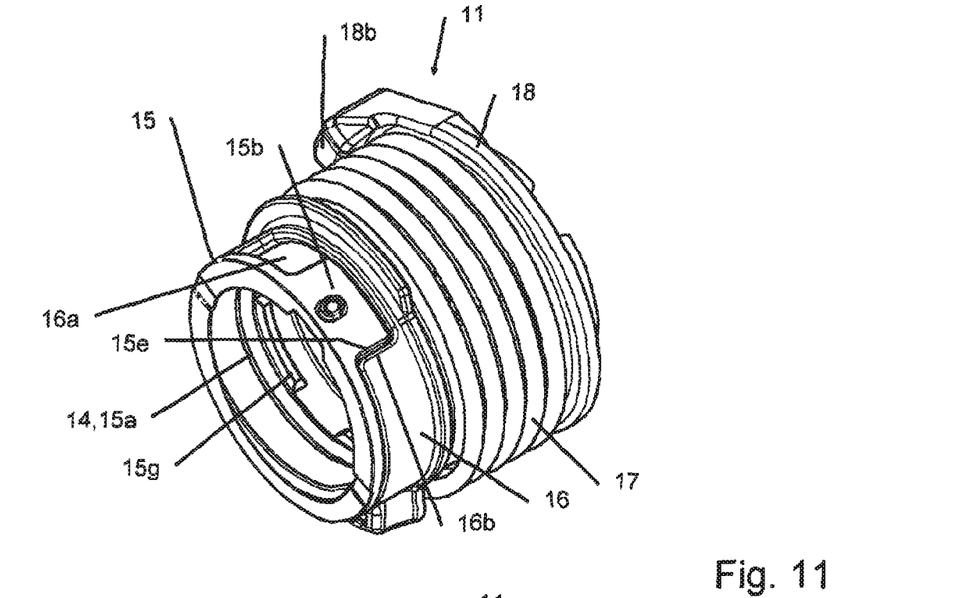
FIG. 11 shows schematically an adjustment mechanism in a normal position according to an embodiment of the invention.
Figure 12:
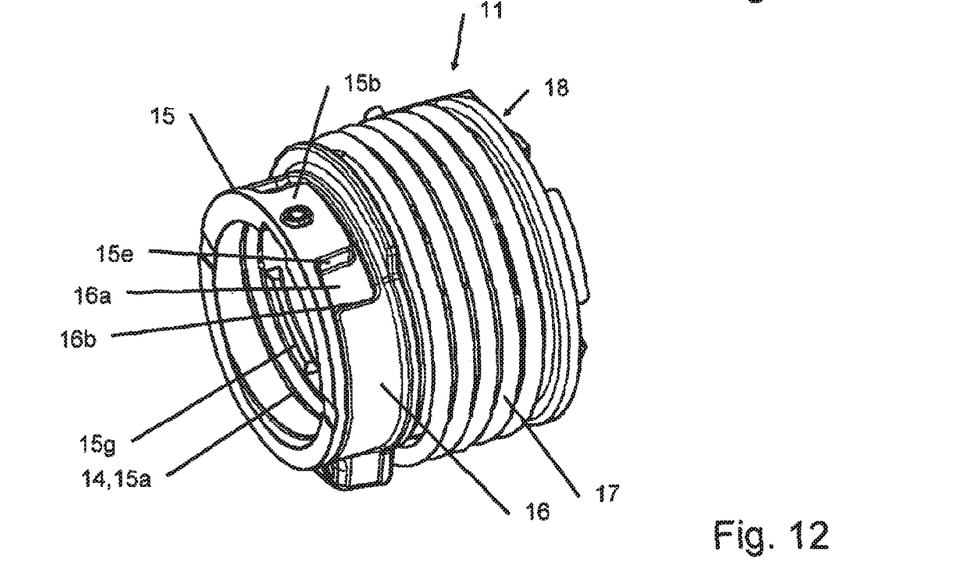
FIG. 12 shows the same view as FIG. 11 but in the overload range.

If there is a change in the release clearance, with a deviation from the desired release clearance L, and the pivoted lever 6 is pivoted further, the driver pin 20 presses against the groove wall 16g in direction 20z, and the grooved ring 16 is rotated. By virtue of the stiffness/rigidity or preloading torque M2 of the torsion spring 17, which is of degressive configuration in the illustrative embodiment shown in the drawing, the grooved ring 16 rotates the driver disk 18 connected to the guide sleeve 15, with the result that the wrap spring 14 resting between the guide sleeve 15 and the external thread 7a of the actuating spindle 7 transmits the torque to the actuating spindle 7 because of its rotation in the locking direction. Since the preloading torque M2 is higher than the frictional torque M1 exerted on the actuating spindle 7 by the brake ring 19, the actuating spindle 7 rotates, and the release clearance is reduced. During this process, the adjustment mechanism 11 follows the movement of the actuating spindle 7 synchronously in the adjustment direction 11n, reducing the functional clearance X.

If the pivoted lever 6, including the braking shaft 6a, is moved back by the compression springs 9 after the braking process, the driver pin 20 moves in the release direction 20l and, in striking against the groove wall 16h, rotates the grooved ring 16 back into the initial position. Since the frictional torque M1 exerted on the actuating spindle 7 by the brake ring 19 is higher than the free-running torque M3 of the wrap spring 14, the wrap spring 14, together with the remaining parts of the adjustment mechanism 11, is rotated back in the release direction 11l on the actuating spindle 7, which does not rotate during this process, until it reaches its initial position again with the functional clearance X.

Thus, the desired release clearance L is re-established.

If the brake actuations which take place go beyond the normal braking stroke with corresponding elastic deformations of the brake caliper 3, for example, or if increased pad wear occurs during downhill stretches due to prolonged braking operations, the torque on the wrap spring 14 rises sharply owing to the overstroke, and the rotary movement of the guide sleeve 15 is stopped. Further rotary movement of the grooved ring 16, driven in the application direction 20z by the driver pin 20, thus produces a deformation of the torsion spring 17 beyond the preloading of the system. In this process, the grooved ring 16 with the recess 16a rotates further and, in the process, its stop surface 16b rises from the stop surface 15e of the guide sleeve 15, cf. FIG. 12. Since the torsion spring 17 in the illustrative embodiment shown in the drawing is of degressive configuration, only a relatively small rise in the spring torque is produced by the overstroke. However, the preloading torque M4 of the torsion spring 17 due to its contraction/deformation in the end position is lower than the minimum necessary and transmissible blocking torque M5 of the wrap spring 14 relative to the actuating spindle 7.

When the pivoted lever 6, together with the braking shaft 6a, pivots back into its initial position after the braking process, the grooved ring 16 rotates back in direction 20l because of the movement of the driver pin 20 until the preloading of the torsion spring 17 is reached again. The stop surfaces 15e and 16b then also rest against one another. This corresponds to the initial position shown in FIG. 11.

Excessive adjustment is thus avoided because the torsion spring 17 absorbs the overstroke into its deformation. Unlike the situation in known disk brakes, it thus does not act as a mechanical separating device with corresponding coupling parts.

Another advantage of the torsion spring 17 in the illustrative embodiment shown in the drawing consists in the fact that it stores energy by deformation during the overstroke and brings about an adjusting movement on the actuating spindle 7 via the adjustment mechanism 11 by expansion during the return stroke of the pivoted lever 6, until the parts of the adjustment mechanism 11 are once again braced in the preloaded initial state and the stop surfaces 15e and 16b rest against one another.

It is thus possible, by means of the above-described embodiment of the subassembly of the adjustment mechanism 11, to control required adjusting movements in an effective manner by simple means and without the mechanical separating clutches known from conventional brakes. In this case, it is also possible to reduce the number of adjusting steps for setting the desired release clearance in comparison with known brakes because the adjusting process can take place in both directions of movement of the pivoted lever, depending on the circumstances or progress of the braking process. Thus, the desired release clearance can be set more quickly than in conventional solutions, which perform adjustment only during movement in one direction. The brake stroke or braking efficiency can thereby also be improved indirectly.

If manual adjustments are required as part of service work on the brake itself or while changing the brake pads, for example, this is accomplished by rotating the actuating spindle 7 in the application or release direction by suitable means via the functional opening 23 already mentioned above on the rear side of the brake caliper 3.

As regards the choice of materials for the adjustment mechanism 11, it should be noted that the guide sleeve 15, the grooved ring 16 and the driver disk 18, in particular, can be produced from the same or different materials, e.g. metal, formed sheet metal parts, sintered material and/or plastic.

Although the invention has been explained with reference to a single-spindle brake, the adjustment mechanism according to the invention can also be used in a two- or multi-spindle brake. In the case of a two-spindle brake, for example, each actuating spindle can be equipped with a dedicated adjustment mechanism. As an alternative, the adjusting movement can be transmitted in synchronism to the other actuating spindle by just a single adjustment mechanism by means of an appropriate synchronizing device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 disk brake
2 brake disk
2a brake disk plane
3 brake caliper
4 application device
5 movable element (pressure piece/cross piece/bridge)
5a end face, axial (in direction 15f)
6 pivoted lever
6a eccentric braking shaft
7 actuating spindle
7a external thread of the actuating spindle
8 pressure piece
9 return spring in the form of a compression spring
10 brake pad
10a brake pad carrier
11 adjustment mechanism
11n adjusting direction (of 11)
11l release direction (of 11)
12 input region
13 output region
14 wrap spring (one-way clutch)
14a,b end/s of wrap spring
15 guide sleeve
15a profiled spiral groove
15b radial extension with opening or projection (for 14a)
15c longitudinal opening (for 14b)
15d profiled openings (for 18a)
15e stop surface (for 16b)
15f end face, axial (in direction 5a)
15g projections/moldings (on 15)
16 grooved ring
16a recess/opening (for 15b)
16b stop surface (for 15e)
16c recess/opening (for 14b)
16d stop surface (for 14b)
16e radial extension with opening (for 17a)
16f axial groove (for 20)
16g groove wall
16h groove wall
17 torsion spring
17a, b end/s of torsion spring
18 driver disk
18a latching projection (for 15d)
18b projection (for 17b)
19 brake ring
20 driver pin (on 6a)
20z application direction (of 20)
20l release direction (of 20)
21 closure cap (on 3)
22 boot
23 functional opening (on 3)
L idle travel/release clearance
X functional clearance (between 5a and 15f)
D pivoting direction, pivoted lever
A-B application and rotation axis of the actuating spindle
M1 constant frictional torque of the brake ring
M2 preloading torque of the torsion spring
M3 free-running torque, wrap spring
M4 preloading torque of the torsion spring in the end position
M5 minimum necessary transmissible blocking torque of the wrap spring

The invention claimed is:

1. A disk brake, comprising:
   a brake disk having a rotation axis,
   a brake caliper,
   at least one application device lying within the brake caliper on one side of the brake disk,
   an axially movable device configured to move a brake pad axially toward the brake disk by way of an actuating spindle when the brake is actuated, wherein the actuating spindle has an external thread configured to engage a threaded bore in the movable device, and
   an adjustment mechanism having a first thread device, the adjustment mechanism being configured to rotate, in each of an adjusting direction and a release direction opposite the adjusting direction, about a rotation axis parallel to the rotation axis of the brake disk,
   wherein the adjustment mechanism is further configured to, during rotation in the adjusting direction, rotate the actuating spindle in the adjusting direction thereby axially moving the actuating spindle relative to the movable device by forming, with the actuating spindle, a rotational coupling acting in the adjusting direction,
   wherein the adjustment mechanism is even further configured to, during rotation in the release direction, rotate relative to the actuating spindle, and
   wherein, during rotation in the release direction, the first thread device of the adjustment mechanism is configured to mesh with the external thread of the actuating spindle that is configured to engage the threaded bore in the movable device,
   wherein the first thread device of the adjustment mechanism is a wrap spring having a same pitch as the external thread of the actuating spindle,
   wherein the wrap spring is configured to rest in a spiral groove of a guide sleeve of the adjustment mechanism, and
   wherein the adjustment mechanism includes a grooved ring mounted rotatably on the guide sleeve.

2. The disk brake as claimed in claim 1, wherein two or more turns of the wrap spring are configured to mesh with the external thread of the actuating spindle.

3. The disk brake as claimed in claim 1, wherein an end section of the wrap spring is configured to be held on the guide sleeve.

4. The disk brake as claimed in claim 3, wherein the spiral groove is configured to mesh with the external thread of the actuating spindle.

5. The disk brake as claimed in claim 1, wherein the adjustment mechanism is configured to be moved axially by at least a distance which corresponds to a maximum adjustment distance per adjustment step.

6. The disk brake as claimed in claim 1, further comprising a braking device which is configured to counteract rotation of the actuating spindle.

7. The disk brake as claimed in claim 1, wherein a width of the groove corresponds to a desired release clearance.

8. The disk brake as claimed in claim 1, wherein the adjustment mechanism has an input region and an output region as well as a torque-dependent clutch situated between the two regions.

9. The disk brake as claimed in claim 8, wherein the torque-dependent clutch has a torsion spring.

10. The disk brake as claimed in claim 9, wherein the torsion spring is preloaded.

11. The disk brake as claimed in claim 9, wherein the torsion spring is configured to store energy in a braking overstroke and hence to adjust the actuating spindle in a release stroke for purposes of brake adjustment.

12. The disk brake as claimed in claim 1, wherein the grooved ring includes an axial groove configured to be engaged by a driver pin held on a braking shaft so as to activate the adjustment mechanism.

13. The disk brake as claimed in claim 1, wherein the adjustment mechanism includes a torsion spring situated between a driver disk of the adjustment mechanism and the grooved ring, wherein the torsion spring is a torque-dependent clutch that is configured to store energy in a braking overstroke and to adjust the actuating spindle in a release stroke.

14. The disk brake as claimed in claim 13, wherein the driver disk includes latching projections configured to engage with circumferential profiled openings formed on the guide sleeve so as to secure the driver disk on the guide sleeve in a fixed manner.

15. A disk brake, comprising:
   a brake disk having a rotation axis,
   a brake caliper,
   at least one application device lying within the brake caliper on one side of the brake disk,
   an axially movable device configured to move a brake pad axially toward the brake disk by way of an actuating spindle when the brake is actuated, wherein the actuating spindle has an external thread configured to engage a threaded bore in the movable device, and
   an adjustment mechanism having a first thread device, the adjustment mechanism being configured to rotate, in each of an adjusting direction and a release direction opposite the adjusting direction, about a rotation axis parallel to the rotation axis of the brake disk,
   wherein the adjustment mechanism is further configured to, during rotation in the adjusting direction, rotate the actuating spindle in the adjusting direction thereby axially moving the actuating spindle relative to the movable device by forming, with the actuating spindle, a rotational coupling acting in the adjusting direction,
   wherein the adjustment mechanism is even further configured to, during rotation in the release direction, rotate relative to the actuating spindle, and
   wherein, during rotation in the release direction, the first thread device of the adjustment mechanism is configured to mesh with the external thread of the actuating spindle that is configured to engage the threaded bore in the movable device, and
   wherein the adjustment mechanism and the axially movable device are configured to remain, except during any braking process and subsequent adjustment step, in a fixed position relative to one another over an entire range of wear-compensating adjustment travel of the axially movable device relative to the actuating spindle.

16. A disk brake, comprising:
   a brake disk having a rotation axis,
   a brake caliper,
   at least one application device lying within the brake caliper on one side of the brake disk,
   an axially movable device configured to move a brake pad axially toward the brake disk by way of an actuating spindle when the brake is actuated, wherein the actuating spindle has an external thread configured to engage a threaded bore in the movable device, and
   an adjustment mechanism having a first thread device, the adjustment mechanism being configured to rotate, in each of an adjusting direction and a release direction opposite the adjusting direction, about a rotation axis parallel to the rotation axis of the brake disk, wherein the adjustment mechanism is further configured to, during rotation in the adjusting direction, rotate the actuating spindle in the adjusting direction thereby axially moving the actuating spindle relative to the movable device by forming, with the actuating spindle, a rotational coupling acting in the adjusting direction, wherein the adjustment mechanism is even further configured to, during rotation in the release direction, rotate relative to the actuating spindle, wherein, during rotation in the release direction, the first thread device of the adjustment mechanism is configured to mesh with the external thread of the actuating spindle that is configured to engage the threaded bore in the movable device, wherein the adjustment mechanism includes a grooved ring having an axial groove configured to be engaged by a driver pin held on a braking shaft so as to activate the adjustment mechanism, and wherein the braking shaft is configured to be moved, after a braking process, by compression springs so as to cause the driver pin to move in a release direction thereby striking a wall of the axial groove and rotating the grooved ring in order to establish a desired release clearance between the brake disk and the brake pad.

17. The disk brake as claimed in claim 16, wherein the first thread device of the adjustment mechanism is a wrap spring having a same pitch as the external thread of the actuating spindle.

18. The disk brake as claimed in claim 17, wherein the wrap spring is configured to rest in a spiral groove of a guide sleeve of the adjustment mechanism.

19. The disk brake as claimed in claim 18, wherein the grooved ring is mounted rotatably on the guide sleeve.

20. The disk brake as claimed in 16, wherein the axial groove includes the wall and a second wall, and wherein the desired release clearance between the brake disk and the brake pad is defined by a difference between a width between the wall and the second wall and a width of the driver pin.

* * * * *